(12) United States Patent
Dale

(10) Patent No.: US 8,240,155 B2
(45) Date of Patent: Aug. 14, 2012

(54) METHOD OF PRESENTING BEER

(76) Inventor: Kevin Dale, Melbourne (AU)

( * ) Notice: Subject to any disclaimer, the term of this patent is extended or adjusted under 35 U.S.C. 154(b) by 594 days.

(21) Appl. No.: 12/377,779

(22) PCT Filed: Aug. 17, 2007

(86) PCT No.: PCT/AU2007/001162
§ 371 (c)(1),
(2), (4) Date: Feb. 20, 2009

(87) PCT Pub. No.: WO2008/019444
PCT Pub. Date: Feb. 21, 2008

(65) Prior Publication Data
US 2009/0241559 A1 Oct. 1, 2009

(30) Foreign Application Priority Data
Aug. 18, 2006 (AU) .............................. 2006904483

(51) Int. Cl.
*F25D 25/00* (2006.01)
*F17C 13/00* (2006.01)

(52) U.S. Cl. ......................................... 62/62; 62/457.9

(58) Field of Classification Search ................ 62/62, 66, 62/294, 457.9, 457.4
See application file for complete search history.

(56) References Cited

U.S. PATENT DOCUMENTS

| 1,969,643 | A |   | 8/1934  | Fuchs et al. |
|-----------|---|---|---------|--------------|
| 2,001,040 | A |   | 5/1935  | Sweeny |
| 4,068,010 | A |   | 1/1978  | Karr |
| 5,214,925 | A | * | 6/1993  | Hoy et al. .................... 62/50.6 |
| 5,845,501 | A |   | 12/1998 | Stonehouse et al. |
| 6,974,598 | B2 | * | 12/2005 | Scullion et al. ............... 426/592 |
| 2003/0145620 | A1 | * | 8/2003 | Newman ......................... 62/373 |

FOREIGN PATENT DOCUMENTS
WO WO 02/03000 A1 1/2002
* cited by examiner

*Primary Examiner* — Chen Wen Jiang
(74) *Attorney, Agent, or Firm* — Edwin D. Schindler

(57) ABSTRACT

A method for serving beer from a font includes the steps of first chilling a glass for the beer to a temperature of below, at least, −5° C. and then filling the glass with beer from the font, so that crystals of frozen beer are present in the drink below the head of foam on the beer that is created when the beer is poured.

8 Claims, 1 Drawing Sheet

METHOD OF PRESENTING BEER

TECHNICAL AREA

This invention relates to the area of dispensing beverages and in particular to a method of serving beer in chilled form such that the normal preferred presentation of the beer is retained.

BACKGROUND TO THE INVENTION

In recent years it has become commonplace for beers to be chilled and served at a temperature close to but above zero ° C.

To enhance the illusion of a really chilled beer it is also commonplace for beer to be dispensed through a font which is itself cooled sufficiently that ice forms on the outside of the font.

Where beer is cooled close to zero there can be a diminution in the flavour of the beer as well as a reduction in the head of froth when it is poured, all of which tends to make it visually less appealing to the consumer.

Where a really cool drink is required it is difficult to preserve the characteristics of normal beer as the beer temperature is reduced and, in particular, if ice is added to the beer the flavour of the beer is diluted. This can be avoided to a certain extent by using frozen beer as ice, however the freezing process expels the beer flavour to the exterior of the ice crystals so that the effect is once again of ice crystals floating in the resultant drink.

OUTLINE OF THE INVENTION

It is an object of this invention to ameliorate the above problems by providing a means for chilling beer such that crystals of frozen beer are present in the drink as served while still preserving the head and general appearance of a normal beer.

The invention is a method of serving a drink of beer from a conventional font by first chilling a glass to a temperature of at least −5° C. then filling the glass with beer from the font such that crystals of frozen beer are present in the drink below a normal head of foam on the beer.

It is preferred that the glass be chilled to between −10° C. and −20° C.

It is further preferred that a coolant such as liquid carbon dioxide be used to cool the glass.

It is also preferred that the source of the liquid CO2 be a stand alone unit programmed to deliver the coolant for a predetermined period of time to a glass upended over the coolant source.

In order that the invention may be more readily understood we shall describe by way of non limiting example a specific embodiment thereof with reference to the accompanying drawings.

BRIEF DESCRIPTION OF THE DRAWING FIGURES

BRIEF DESCRIPTION OF AN EMBODIMENT OF THE INVENTION

In a preferred embodiment of the invention a method of serving beer is provided which utilises a standard means of cooling a glass. While any cooling means may be used in the invention it is preferred that a conventional glass chiller be used.

Conventional glass chillers have a spigot which can spray liquid carbon dioxide into a glass such that it is chilled to approximately zero degrees.

Figure 1:
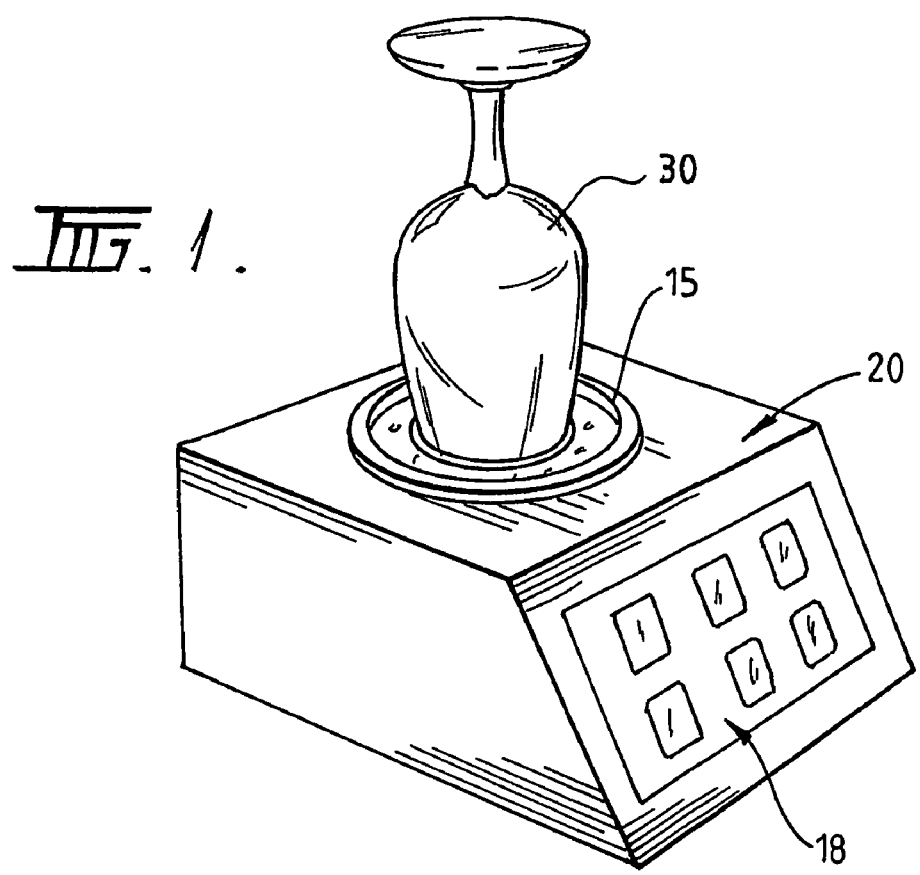
FIG. 1 Shows a glass for the beer being cooled over a coolant source.

The glass chiller 20 of the invention as shown in FIG. 1 is a bench mounted stand alone device having a receptor plate 15 into which an upended glass 30 is placed while a coolant is sprayed into the glass for a predetermined period of time as selected by activating switch means 18 on the chiller device.

While any chosen coolant may be used it is preferred that the coolant be liquid carbon dioxide.

The method of the invention involves selecting a time period on the chiller which is sufficient to chill the glass to at least −5° C. and preferably to −10° C. or greater. The chiller device of the invention is adapted to chill a glass as low as −20° C. and it has been found that no further cooling is required however there is no lower limit prescribed in the invention and the cooling period selected will to a certain extent be determined by ambient conditions.

While the cooling of a glass to the required temperature could be effected by repeatedly carrying out the chilling operation with a standard glass chiller, usually each time being only for a short time period of a few seconds, it is preferable to have the procedure carried out with the customised chiller of the invention for convenience sake.

Figure 2:
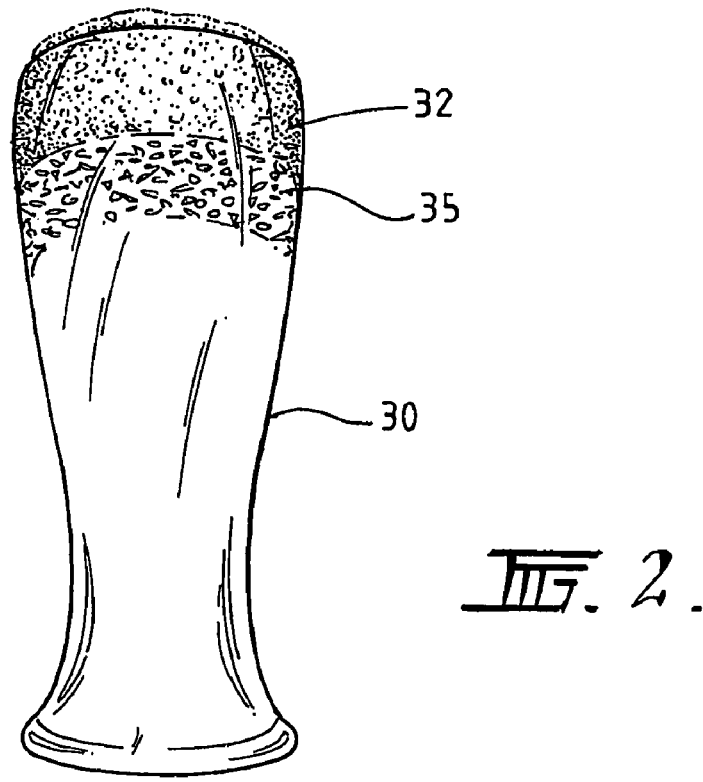
FIG. 2 Shows a schematic drawing of the product of the invention being a glass of beer of standard appearance having beer crystals below the head.

Once an appropriate glass temperature has been achieved the beer is then dispensed in the normal fashion into the glass 30 as shown in FIG. 2 and forms a conventional head of froth or foam 32 on the top of the beer with a layer of beer crystals 35 directly below the head.

The inside of the glass snap freezes the beer in contact with its inside walls and and the glass is then left for a brief period on the counter, or wherever convenient, of the place where it has been dispensed.

After a short period the frozen beer crystals in contact with the inside of the glass come away and form a beer/frozen beer crystal slurry 35 below the foam head of the beer which has been dispensed.

The resultant beer is not only well chilled but has retained the normal beer flavour as no ice in the form of frozen water has been added, also the snap freezing of the beer does not allow sufficient time for the beer flavour to be extruded from the beer crystals in suspension.

Beer served by this method not only has the appearance of normal beer but has true beer flavour while containing iced beer and is an appealing product to a drinker particularly in hot weather.

The precise means used to chill the inside of the glass is not restricted in the invention although the method described which uses carbon dioxide does not contaminate the beer with any foreign material.

Therefore whilst we have described herein one specific embodiment of the invention it is envisaged that other embodiments of the invention will exhibit any number of and any combination of the features previously described and it is to be understood that variations and modifications in this can be made without departing from the spirit and scope of the invention.

The claims defining the invention are as follows:

1. A method for serving beer from a font, comprising the steps of:
   chilling a container for beer to a temperature of at least −5° C.; and,
   filling the container with the beer from the font, the beer being delivered from the font at a temperature above the freezing point of water for creating a drink having a head of foam and crystals of frozen beer formed below the head of foam after filling of the container with the beer.

2. The method for serving beer from a font according to claim 1, wherein said container is made of glass.

3. The method for serving beer from a font according to claim 2, wherein said chilling step is carried out by chilling an interior of the glass to a temperature between −5° C. and −10° C.

4. The method for serving beer from a font according to claim 2, wherein said chilling step is carried out by chilling an interior of the glass to a temperature between −5° C. and −20° C.

5. The method for serving beer from a font according to claim 2, wherein said chilling step is carried out by chilling an interior of the glass to a temperature between −5° C. and −25° C.

6. The method for serving beer from a font according to claim 2, wherein said chilling step is carried out by chilling an interior of the glass to a temperature below −25° C.

7. The method for serving beer from a font according to claim 1, wherein said chilling step is carried out using a liquid carbon dioxide coolant released into an interior of the container.

8. The method for serving beer from a font according to claim 2, wherein said chilling step is carried out using a liquid carbon dioxide coolant released into an interior of the glass.

* * * * *